(12) United States Patent
Lagrange et al.

(10) Patent No.: US 7,797,755 B2
(45) Date of Patent: Sep. 14, 2010

(54) METHOD TO SECURE THE TRANSFER OF A DATA STREAM, CORRESPONDING COMPUTER PROGRAM PRODUCT, STORAGE MEANS AND NODES

(75) Inventors: Pascal Lagrange, Rennes (FR); Laurent Frouin, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1448 days.

(21) Appl. No.: 11/190,105

(22) Filed: Jul. 27, 2005

(65) Prior Publication Data

US 2006/0029228 A1  Feb. 9, 2006

(30) Foreign Application Priority Data

Aug. 6, 2004 (FR) .................................. 04 08740

(51) Int. Cl.
*G06F 21/24* (2006.01)
(52) U.S. Cl. .......................... 726/29; 726/3; 726/168; 713/153; 713/168
(58) Field of Classification Search .................. None
See application file for complete search history.

(56) References Cited

U.S. PATENT DOCUMENTS

| 5,966,448 | A | * | 10/1999 | Namba et al. ........... 380/33 |
| 6,529,513 | B1 | * | 3/2003 | Howard et al. ........... 370/401 |
| 7,487,539 | B2 | * | 2/2009 | Ramachandran et al. ...... 726/10 |

(Continued)

FOREIGN PATENT DOCUMENTS

EP   0 887 982 A   12/1998

(Continued)

OTHER PUBLICATIONS

Doraswamy et al., "IPSec—The New Security Standard for the Internet, Intranets, and Virtual Private Networks", 2003, Prentice Hall, $2^{nd}$ Edition, pp. 93-100.*

(Continued)

*Primary Examiner*—Minh Dinh
(74) *Attorney, Agent, or Firm*—Fitzpatrick, Cella, Harper & Scinto

(57) ABSTRACT

In a method for securing the transfer of a data stream from a sender device to at least one receiver device, through a network comprising a plurality of nodes connected to one another by a plurality of links, the sender device is connected to an input node in the network and each receiver device is connected to an output node of the network. The method comprises the following steps: a) the transmission of the data stream to the receiver devices through the associated output nodes; b) the informing of the output nodes by the input node that the transmission or maintaining of transmission of the data stream, in clear (i.e. non-encrypted) form necessitates the authentication of the output nodes; c) the reception by the input node of at least one authentication request sent by at least one of said output nodes; d) the authentication by the input node of the output nodes that are destination nodes of the data streams; e) the transmission of the data stream in clear form to, at most, the authenticated output nodes and the stopping of the transmission of the data stream to the other output nodes.

12 Claims, 8 Drawing Sheets

U.S. PATENT DOCUMENTS

2004/0073786 A1 4/2004 O'Neill et al.

FOREIGN PATENT DOCUMENTS

WO 02/096151 A 11/2002

OTHER PUBLICATIONS

Stallings, "Cryptography and Network Security—Principles and Practices", 2003, Prentice Hall, $3^{rd}$ Edition, pp. 485-496, 501-515.*

Menezes et al., *Handbook of Applied Cryptography*, CRC Press, USA, 1997, pp. 386, 491.

* cited by examiner

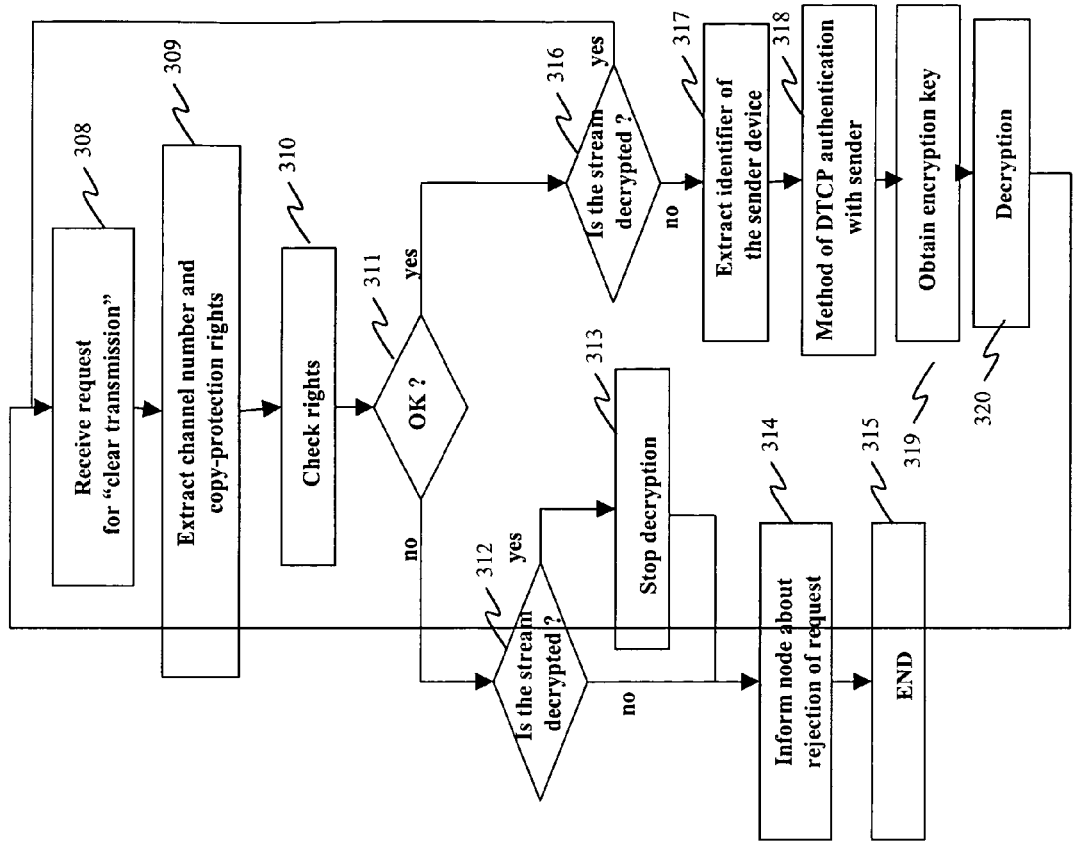
Fig. 4C
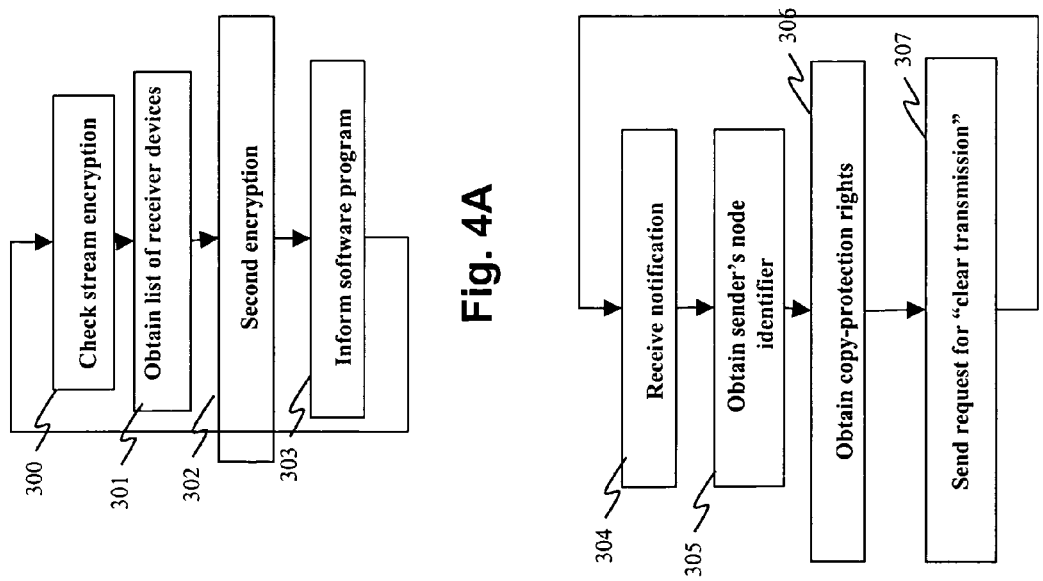
Fig. 4A
Fig. 4B

METHOD TO SECURE THE TRANSFER OF A DATA STREAM, CORRESPONDING COMPUTER PROGRAM PRODUCT, STORAGE MEANS AND NODES

1. FIELD OF THE INVENTION

The field of the invention is that of data communications networks. More particularly the invention relates to the copy protection of isochronous data transmitted between several terminal devices in such a network.

2. DESCRIPTION OF THE RELATED ART

The modern equipment that a family may install is often designed to transmit different types of data such as video, sound, photographs, text files and so on. The transmission of this data is governed by requirements that are variable according to the type of data considered. In particular, this data must be conveyed by means of cables or adapted links. Thus, each data format has a corresponding adapted means of transportation and a type of connector by which the devices are connected to each other. For example, devices processing digital data may work according to the IEEE-1394 standard.

The invention can be applied especially to an audio-video network, for example a home network comprising a backbone network itself comprising nodes. The nodes have items of equipment or devices connected to them, directly through analog links or indirectly, for example, through serial digital buses compliant with the IEEE-1394 standard. It may be recalled that this standard is described in the following reference documents: "IEEE Std 1394-1995, Standard for High Performance Serial Bus" and "IEEE Std 1394a-2000, Standard for High Performance Serial Bus (Supplement)".

FIG. 1A illustrates an example of an audio-video home network 1000 of this kind. This home network 1000 comprises a backbone network 1001 itself comprising nodes interconnected to a central switch unit 015, a drawing of which is presented in FIG. 1B.

The central switch unit 015 has several switching devices including especially a switching device 150a. This same switching device 150a is connected to three other switching devices referenced 150b, 150c and 150d. For the sake of simplicity, FIG. 1B shows a switching unit 015 such as this comprising only four switching devices.

The switching device 150a is connected by means of a cable 153a to the switching device 150d. It is also connected by means of another cable 153d to the switching device 150c which is also connected by another link 153e to the switching device 150d.

The switching device 150c is connected to the switching device 150b by means of a link 153c and finally the switching device 150b is connected to the switching device 150a by means of a communications link 153b.

It must be noted that the switching devices 150a, 150b, 150c and 150d are inserted in the partition walls of a dwelling. However, they may be independent of the partition walls and may thus be movable.

The device 150a is placed for example in the partition wall 152a of a room such as a living room, the device 150b in the partition wall 152b of another room such as the kitchen, the device 150c in the partition wall 152c of a room such as a study, and the device 150d in the partition wall 152d of a bedroom The switching devices 150a, 150b end 150c are connected to nodes 003, 004 and 005 of the backbone network 1001 by means of a single medium, in this case cables 151a, 151b and 151c.

The node 003 is also connected to terminal devices:
a television set 014, a DVD player 013 and videocassette player VHS 012 through analog links;
an audio-video hard disk drive 006, a digital videocassette player VHS 007 and an IEEE-1394 008 compliant digital DVD by means of an IEEE-1394 001 digital series bus.

The node 004 is connected through an IEEE-1394 002 digital series bus to a digital television set 009, a digital videocassette recorder VHS 010 and an IEEE-1394 011 tuner.

A known technique used to guarantee copy protection for isochronous streams such as audio-video contents in a home network such as the one of FIG. 1A lies in the cascaded implementation of the DTCP ("Digital Transfer Content Protection") protocol. The characteristics and recommendations of this protocol are described in detail in the following reference document: "Digital Transmission Content Protection Specification, Volume 1 and 2, Draft 1.29".

FIG. 2 is a draft illustrating the cascaded implementation of the DTCP protocol in a generic network 20 comprising two nodes 204 and 205. It is clear that this cascaded DTCP protocol, herein implemented in a generic network for the sake of simplicity can also be implemented in the home network 1000 of FIG. 1.

The nodes 204 and 205 are interconnected by means of an IEEE-1394 201 serial bus. The node 204 is also connected to a transmitter device 203 by means of an IEEE-1394 200 serial bus, just as the node 205 is connected to a receiver device 206 by means of an IEEE-1394 202 serial bus.

When the sender device 203 transmits an encrypted data stream 209, encrypted by means of its own encryption key (referenced key (N#X) in FIG. 2), in the generic network 20, it implements the format of IEEE-1394 isochronous packets combined with the DTCP recommendations.

When the receiver device 206 wishes to receive a data stream, it must first of all verify whether this stream is copy-protected (see the definition of EMI bits in "Digital Transmission Content Protection Specification, Volume 1 and 2, Draft 1.29"). Then, if the stream is copy-protected, the receiver device 206 must get authenticated with the node 205 by means of a DTCP method of authentication comprising the sending of an authentication request 214 succeeded by a response 215 coming from the node 205. Once this DTCP method of authentication has been successfully performed, the node 205 implements the same DCTP method of authentication with the node 204. Once this DTCP method has been successfully performed, the node 204 implements the same DCTP method of authentication with the sender device 203. Once this DTCP method has been successfully performed, the receiver device 206 can decrypt the protected stream.

Thus, for each data stream to be transmitted, this cascaded DTCP protocol necessitates the implementation of an encryption of the data stream, a DTCP authentication method and then a description, and this is the case at each transmission from one device or node of the network to another device or node of the network. It therefore leads to the implementation of a large number of steps managed by one or more software programs and hence to an overloading of the network in which it is implemented and major data stream transmission time.

3. GOALS OF THE INVENTION

The invention is aimed especially as at overcoming these drawbacks of the prior art.

More specifically, it is a goal of the invention to provide a technique of copy protection for data streams in a communications network comprising analog links and digital links transparently for the terminals, in achieving this by limiting the network load related to this protection.

It is another goal of the invention to implement a technique of this kind that can be used to reduce the transmission time for data streams in such a network.

It is yet another goal of the invention to provide a technique of this kind that is sure, simple to implement and costs little.

4. ESSENTIAL CHARACTERISTICS OF THE INVENTION

These goals, as well as others that shall appear hereinafter, are achieved by means of a method for securing the transfer of a data stream from a sender device to at least one receiver device, through a network comprising a plurality of nodes connected to one another by a plurality of links, the sender device being connected to an input node in the network, each receiver device being connected to an output node of the network.

According to the invention, a method of this kind comprises the following successive steps:
- a) the transmission of the data stream to the receiver devices through the associated output nodes;
- b) the informing of the output nodes by the input node that the transmission or maintaining of transmission of the data stream, in clear (i.e. non-encrypted) form necessitates the authentication of the output nodes;
- c) the reception by the input node of at least one authentication request sent by at least one of said output nodes;
- d) the authentication by the input node of the output nodes that are destination or recipient nodes of the data streams;
- e) the transmission of the data stream in clear form to, at most, the authenticated output nodes and the stopping of the transmission of the data stream to the other output nodes.

Thus, the fact that the data stream is transmitted in clear (i.e. non-encrypted) form from the input node to the previously authenticated output nodes does away with the need for a step for the encryption of the stream by the input node and a step for the description of the stream by the output nodes while at the same time providing efficient protection.

Thus, a data stream copy-protection technique is obtained limiting the network load related to this protection and reducing the time taken to transmit the stream in the network.

The authentication of the output nodes at the input node is transparent for the receiver and sender devices.

Preferably, the data stream transmitted in the step a) is encrypted with a first key.

According to a first embodiment of the invention, the sender device is of a digital type and performs the encryption of the data stream.

According to a second embodiment of the invention, the sender device is of an analog type and the input node performs the encryption of the data stream.

According to a preferred embodiment of the invention, the transmission of the data stream at the step a) is done in clear form between the input node and the output nodes.

According to an advantageous characteristic of the invention, the sender device is of a digital type and performs a preliminary encryption of the data stream with a first key.

Advantageously, the securing method furthermore comprises a second step for the authentication of the input node with the sender device so as to obtain the first key and decrypt the data stream for its clear transmission to the output nodes.

Preferably, the step of informing by the input node is carried out with a piece of information contained in a control field conveyed with the data stream.

According to an advantageous implementation of the invention, the step of authentication of the output nodes comprises the steps of:
- determining the number N1 of output nodes that are recipient or destination nodes of the data stream;
- determining the number N2 of requests for clear transmission received by the input node and sent by said output nodes;
- authenticating the output nodes if the numbers N1 and N2 are equal.

According to an advantageous characteristic of the invention, the step for determining the number N2 is performed by counting the number of requests for clear transmission really received at the end of a timeout period with a predetermined duration.

Preferably, the request for clear transmission comprises at least one piece of information to quantify a level of authorization of the receiver device for access to the data stream.

According to a preferred embodiment of the invention, if the output nodes are not authenticated, the input node sends a notification to the other nodes informing them of the failure of the authentication.

According to an advantageous characteristic of the invention, if the receiver device is of a digital type, the method furthermore comprises the following steps:
1) encryption of the stream received by the output node with a second key proper to it;
2) transmission by the output node of the encrypted stream to the receiver device;
3) authentication of the receiver device with the output node so as to obtain the second key;
4) decryption of the stream by the receiver device with the second key.

The invention also relates to a computer program product comprising program code instructions to execute steps of the securing method described here above, when the program is executed on a computer.

The invention also relates to an information-storage means, that may be totally or partially movable, readable by a computer system comprising instructions for a computer program adapted to implementing the securing method described here above.

The invention also relates to an input node involved in a secured transfer of a data stream from a sender device to at least one receiver device through a network comprising a plurality of nodes connected to one another by a plurality of links, the sender device being connected to the input node in the network, each receiver device being connected to an output node of the network, the input node comprising:
- a) means for transmitting the data stream to the receiver devices through the associated output nodes;

b) means for informing the output nodes that the transmission or maintaining of transmission of the data stream in clear form necessitates the authentication of the output nodes;

c) means for the reception of at least one authentication request sent by at least one of the output nodes;

d) means for the authentication copy of the output nodes that are destination or recipient nodes of the data stream so that the data stream is transmitted in clear form, by the transmission means to at most the authenticated output nodes.

According to an advantageous mode of implementation of the invention, the input node co-operates with means for the encryption of the data stream, the encryption means implementing a first key.

Advantageously, the encryption means are hosted by the sender device, this device being of a digital type.

According to a preferred characteristic of the invention, the input node incorporates the encryption means, the sender device being of an analog type.

Preferably, the data stream transmitted by the transmission means is a clear data stream.

According to an advantageous mode of implementation of the invention, the sender device is of a digital type and comprises means to encrypt the data stream using a first key.

According to a preferred embodiment of the invention, the input node furthermore comprises second means of authentication with the sender device so as to obtain the first key and means to decrypt the data stream.

Preferably, the informing means co-operate with a piece of information contained in a control field conveyed with the data stream.

According to an advantageous characteristic of the invention, the means authenticating the output nodes comprise:

means for determining the number N1 of output nodes that are destination or recipient nodes of the data stream;

means for determining the number N2 of requests for clear transmission received by the input node and sent by said output nodes;

means to compare the numbers N1 and N2.

Advantageously, the means for determining the number N2 comprise means for counting the number of requests for clear transmission really received at the end of a timeout period with a predetermined duration.

According to an advantageous implementation of the invention, the request for clear transmission comprises at least one piece of information to quantify a level of authorization of the receiver device for access to the data stream.

Advantageously, the input node comprises means for the transmission to the other nodes of a notification of failure of authentication, these means being activated if the output nodes are not authenticated.

The invention also relates to an output node involved an input node involved in a secured transfer of a data stream from a sender device to at least one receiver device through a network comprising a plurality of nodes connected to one another by a plurality of links, the sender device being connected to an input node in the network, each receiver device being connected to the output node of the network, the output node comprising:

means for the reception of the data stream from the input node;

means for the reception of a piece of information stating that the reception or maintaining of the reception of the data stream in clear form necessitates the authentication of the output nodes;

means to transmit an authentication request to the input node.

LIST OF FIGURES

Other features and advantages of the invention shall appear more clearly from the following description of a preferred embodiment, given by way of a simple illustrative and non-exhaustive example, and from the appended drawings, of which:

Figure 1A:
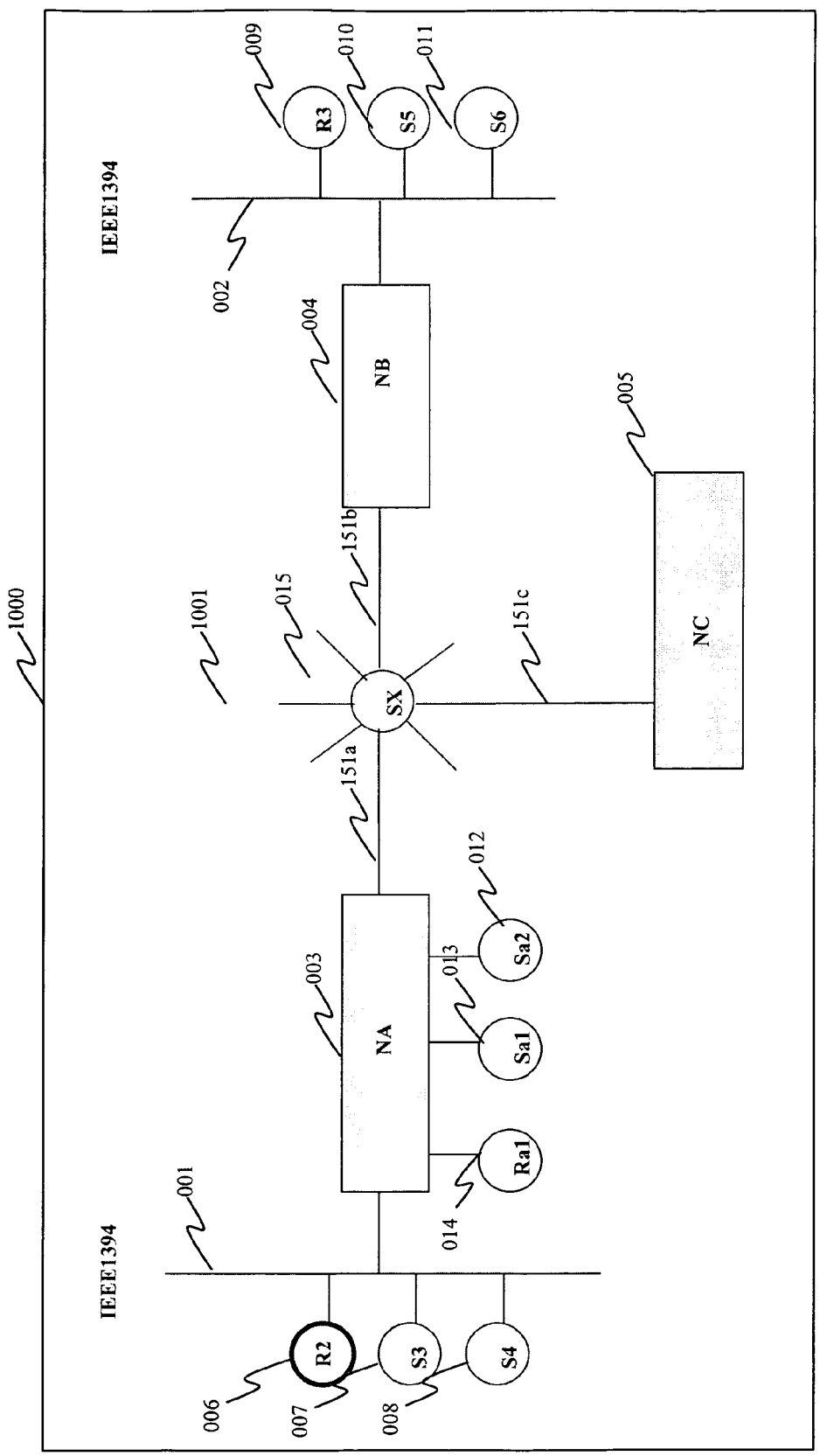
FIG. 1A is a drawing of a home audio-video network in which the method of the invention can be implemented.
Figure 1B:
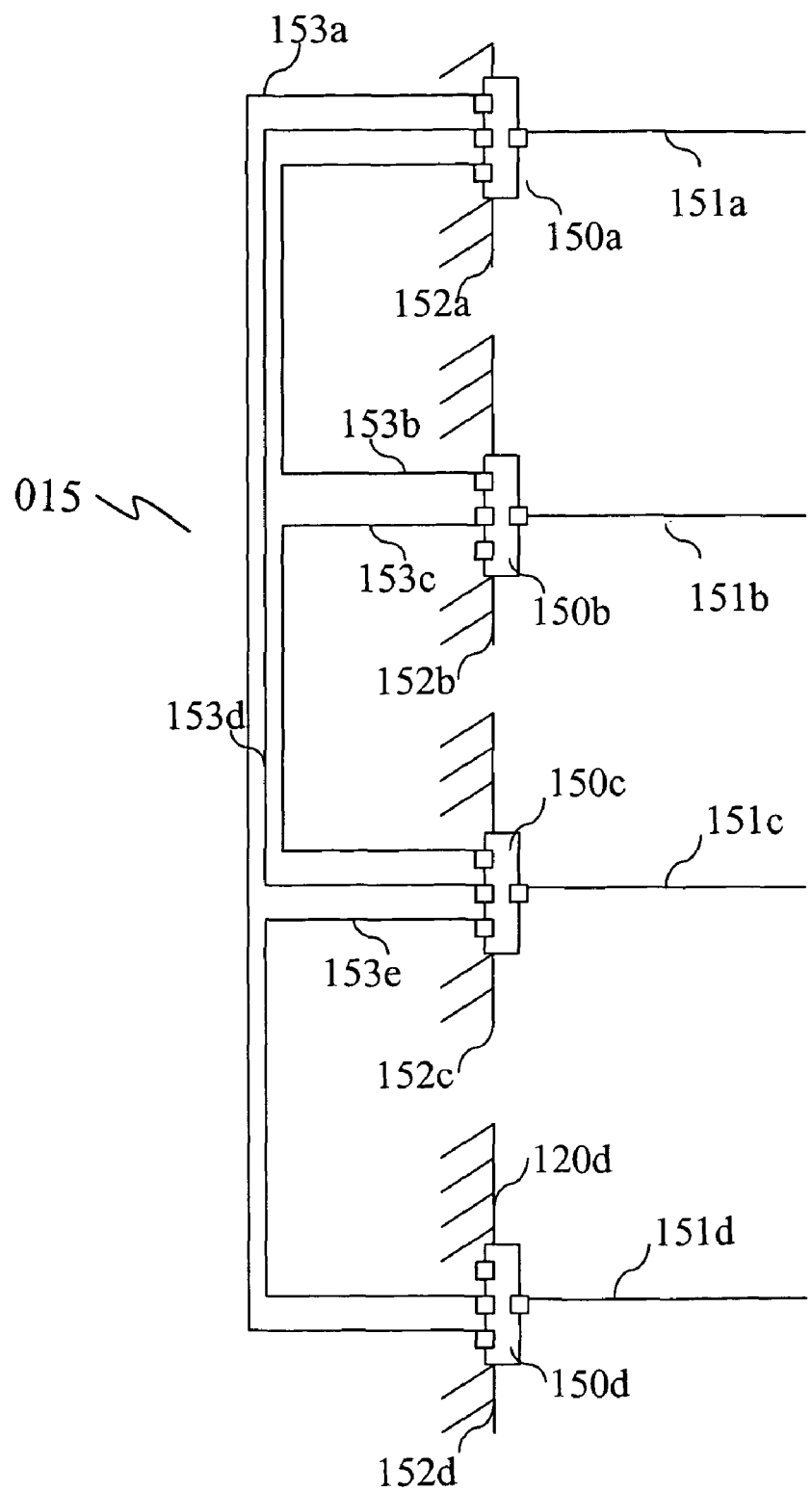
FIG. 1B illustrates the central switching unit of the home network of FIG. 1.
Figure 2:
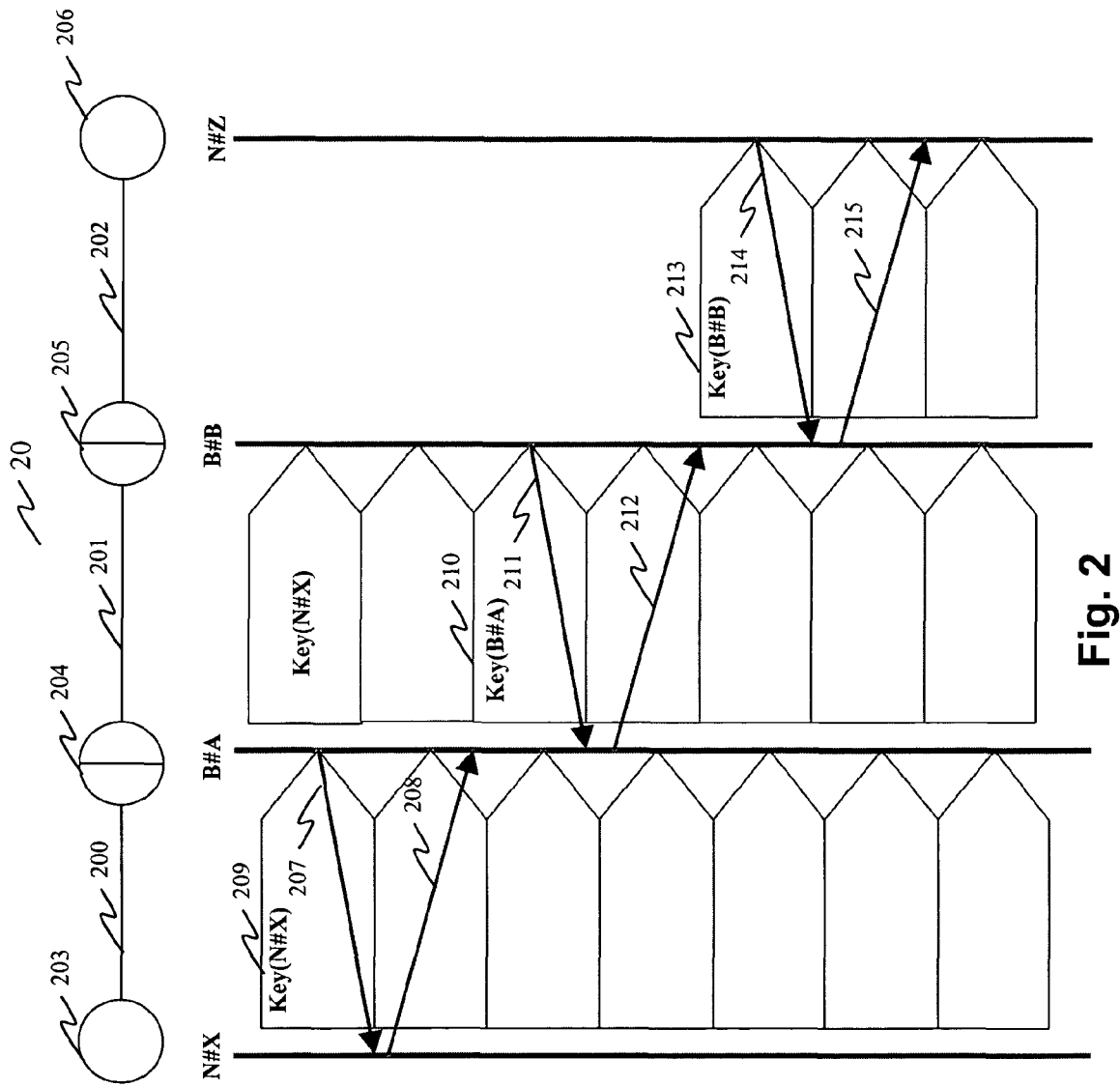
FIG. 2 is a diagram illustrating the implementation of the prior art cascaded DTCP protocol in a generic network.
Figure 5:
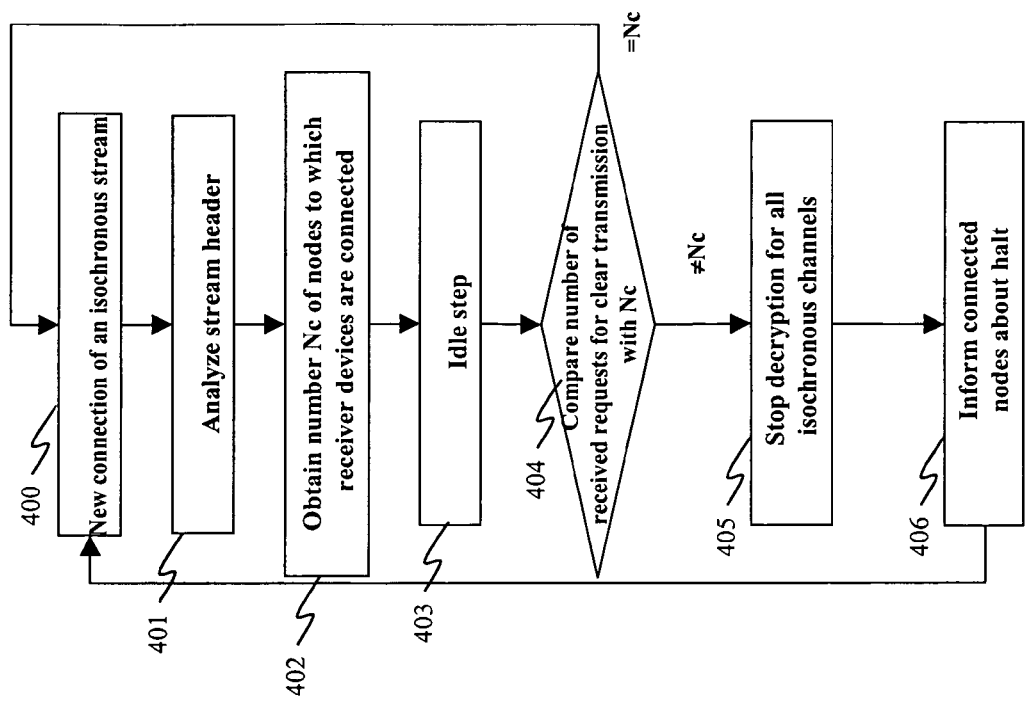
Figure 6:
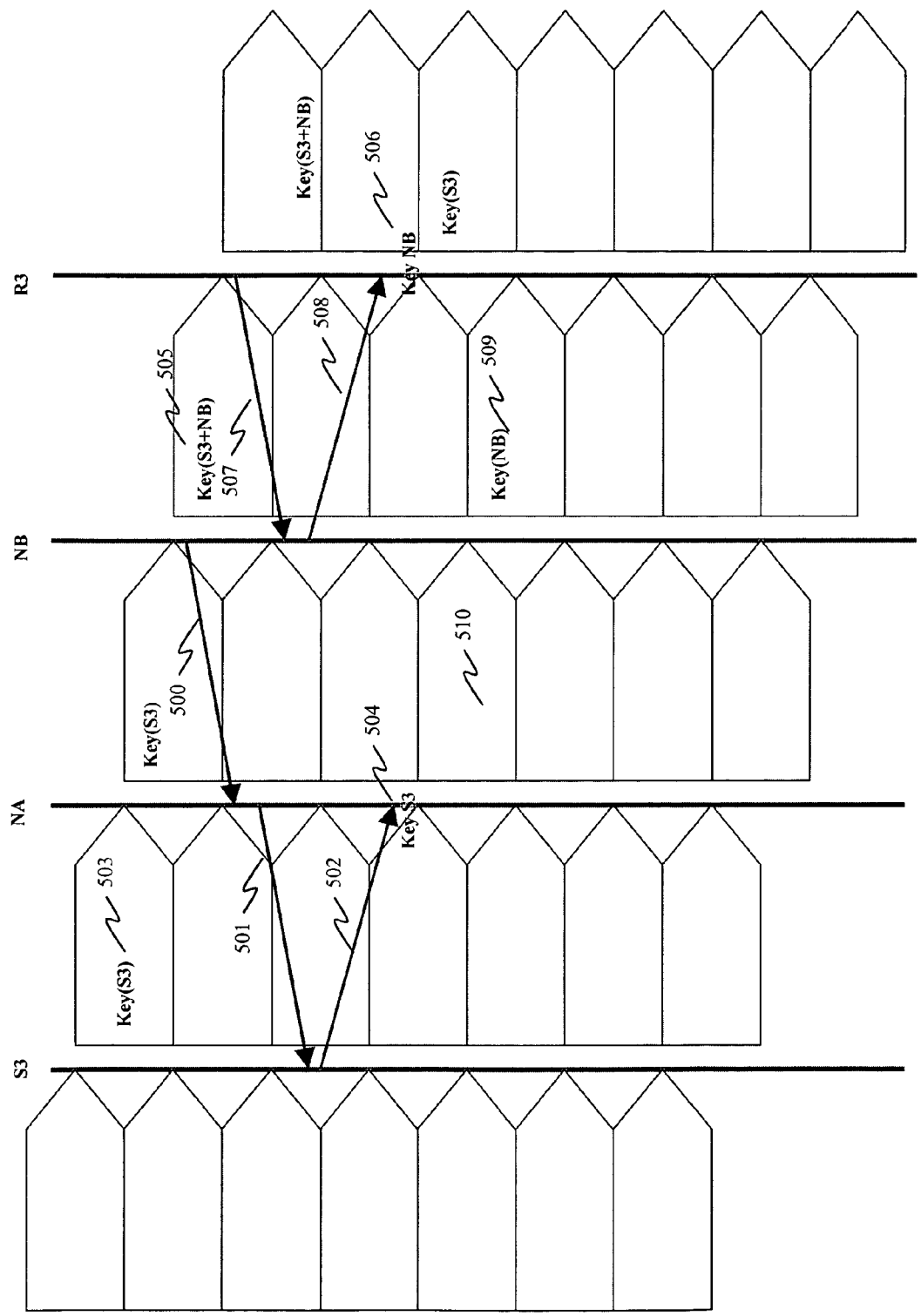
Figure 7:
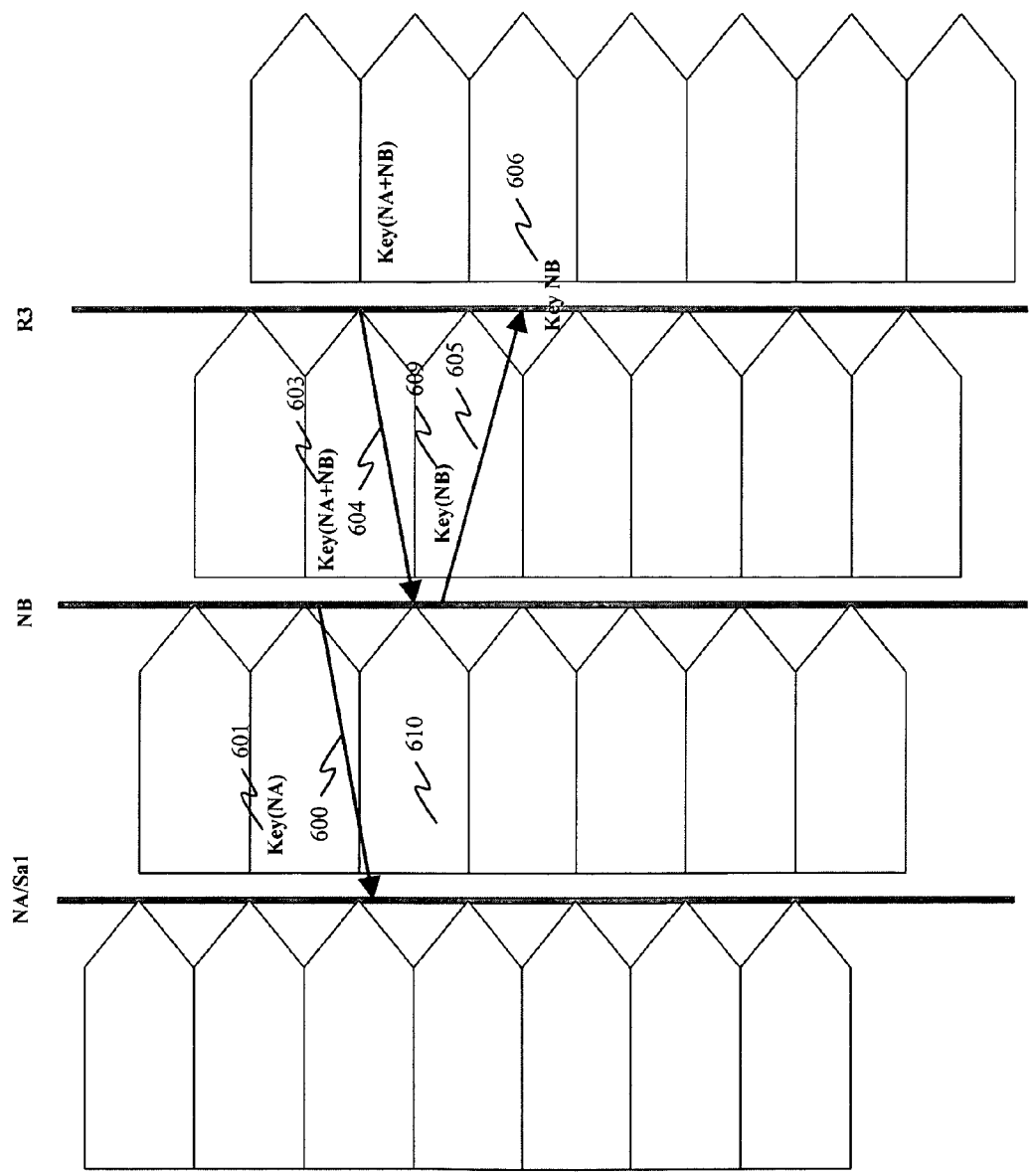

FIGS. 4A, 4B and 4C present algorithms of the method of the invention used to monitor the copy-protected isochronous data streams transmitted in the home network at the component level (FIG. 4A) and at the software level (FIGS. 4B and 4C);

FIG. 5 is a fourth algorithm of the method of the invention used to monitor the copy-protected isochronous data streams transmitted in the home network at the software level;

FIG. 6 illustrates the method of secured transmission between a sender device and a receiver device in the case illustrated by FIG. 1A where the connection links of the devices to the input and output nodes are digital links;

FIG. 7 illustrates the method of secured transmission between a sender device and a receiver device in the case illustrated by FIG. 1A where the connection link between the sender device and the input node is an analog link while the connection link between the receiver device and the output node is a digital link.

6. DESCRIPTION OF AN EMBODIMENT OF THE INVENTION

According to the general principle of the invention, an output node, to which a content-receiving device is connected, sends a request for clear transmission to an input node to which a sender device is connected, the system being designed so that the input node makes clear (i.e. non-encrypted) transmission of the contents to be copy-protected in a backbone network comprising the input and output nodes.

The following description is situated in the context of the home audio-video network 1000 of FIG. 1A in which the securing method according to a preferred embodiment of the invention is implemented.

According to this preferred embodiment of the invention, this securing method is a method of copy protection and is implemented in the form of a software program and/or a plurality of software sub-programs (comprising a plurality of algorithms described here below) executed in one or more machines of the network.

Figure 3:
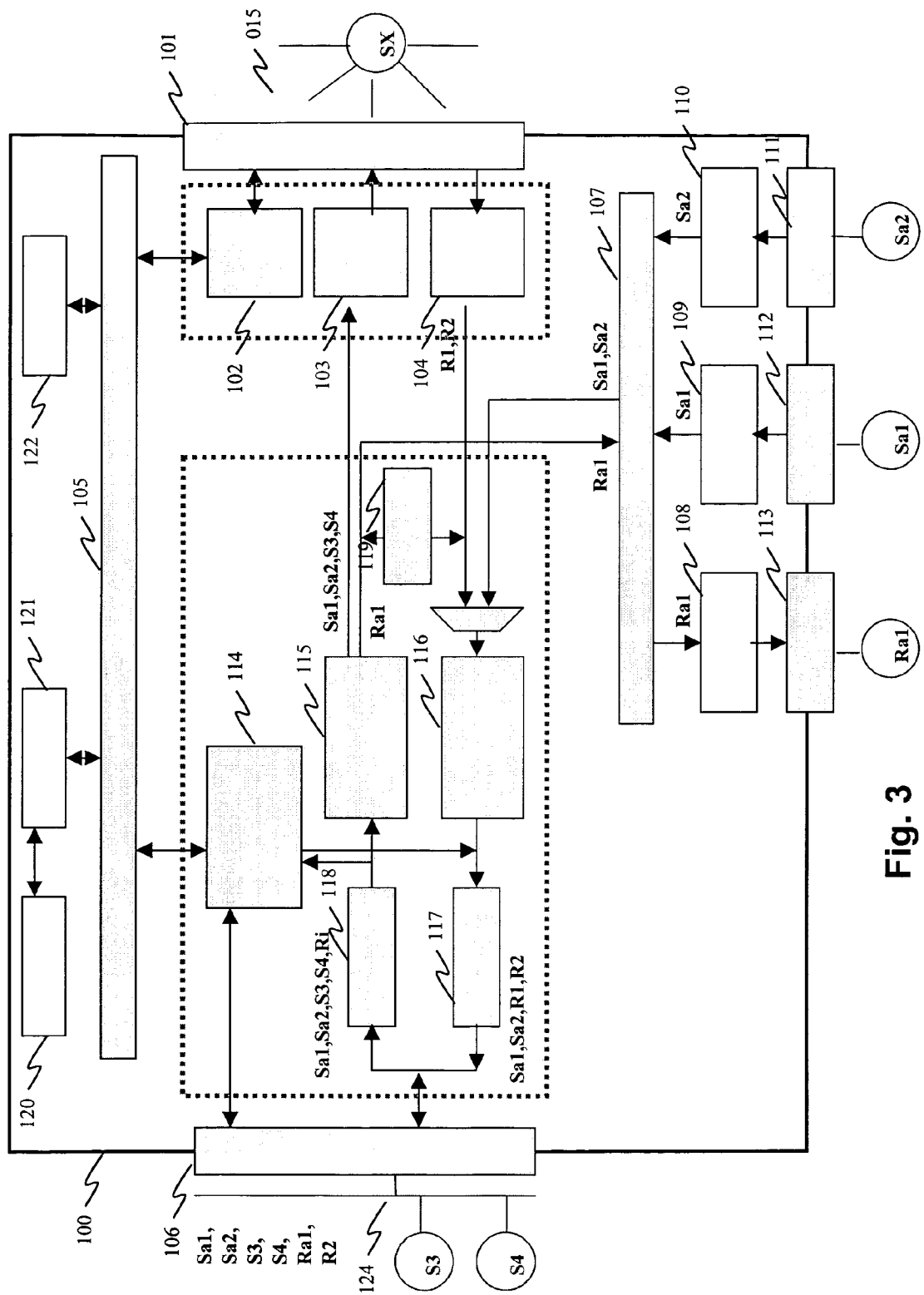
FIG. 3 is a drawing of a node of a home network in which the method of the invention is implemented.

Referring now to FIG. 3, the diagram is presented of an implementation of a node 100 of the whole network 1000 according to a particular mode of implementation of the invention. For the sake of simplicity, the description is limited to this generic node 100 which represents the node 003 as well as the node 004 and even the node 005 of the home network 1000.

The node 100 and is connected to the backbone network 1001 (for which FIG. 3 shows the central switching unit 015) through a digital link and, at the same time, to an IEEE-1394

124 bus and to analog terminal devices referenced Ra1, Sa1 and Sa2 through analog links. The node 100 has a backbone interface network 101 with the backbone network 1001 used by the home network controller 102 in order to transmit and/or receive packets on and/or from the backbone network 1001. The backbone network controller 102 also manages the format of these packets.

The node 100 has a transmission buffer memory (or transmit buffer) 103 implemented for data transmission on the network and a reception buffer memory (or receive buffer) 104 for the reception of data coming from the network.

A microprocessor interface module 105 is responsible for interfacing with the microprocessor (referenced CPU or central processing unit) 121 in order to decode the CPU register and carry out DMA (direct memory access) transfers managed by the microprocessor 121 from or to the SDRAM (synchronous dual random-access memory) block 120.

A serial bus interface module 106 provides the interfaces between the physical layer and the link layer of the IEEE-1394 bus in compliance with the IEEE-1394 standard.

An audio-video interface module 107 carries out the formatting (assembling) and unformatting (disassembling) of the IEEE-1394 stream packets sent on the IEEE bus according to the recommendations of the following reference document: "IEC Std 61883, Consumer audio/video equipment—Digital interface".

The node 100 also includes MPEG2 decoders/encoders 108, 109, 110 respectively connected to audio-video input/output ports 111, 112 and 113 which are themselves connected respectively to the analog terminals Ra1, Sa1 and Sa2.

A transmission control module 114 performs:
all the time critical operations associated with the IEEE-1394 bridge portal (as described in the following reference document: "IEEE P1394.1 Draft 0.15 Standard for High Performance Serial Bus Bridges") including especially:
the monitoring of the incoming packets;
the generation of acknowledgement (ACK) messages;
the management of isochronous and asynchronous routing;
the synchronization of the IEEE-1394 clock;
the management of requests for isochronous transfer between:
the serial bus interface 106 and the backbone network interface 101;
the serial bus interface 106 and the microprocessor interface 105;
the following operations on the stream headers when necessary:
elimination;
insertion requests;
timestamping;
the reception of all the interface signals related to the status and interrupt signals from the serial bus interface 106;
the reception of all the interface signals related to the PHY (physical) register access interface signals from the serial bus interface 106.

The node 100 has a four-key decryption module 115 that implements the decryption algorithms and also gives five independent key configuration registers.

It comprises a one-key encryption module 116 that implements the encryption algorithms and also gives only one encryption key configuration register.

It also has a FIFO (First in First out) isochronous transmission module 117 that implements a 2K×32-bit isochronous FIFO memory.

It also has a FIFO isochronous reception module 118 that implements a 2K×32-bit isochronous FIFO memory.

The node 100 also has a copy-protection detection module 119 that detects copy-protection rights through the analysis of the EMI fields (cf. definition of EMI bits in "Digital Transmission Content Protection Specification, Volume 1 and 2, Draft 1.29") contained in the header of the packets of the isochronous stream.

It also has a flash memory block 122 connected to the microprocessor interface module 105.

Here below, the description (unless otherwise indicated) is placed in the context of a preferred embodiment of the invention wherein, in the home network 1000 of FIG. 1A, there is a transmission of an isochronous data stream comprising a set of copy-protected contents for example, audio-video contents. More specifically, the isochronous stream is transmitted from a sender device 007 referenced S3 to a receiver device 009, referenced R3, through the backbone network 1001. To this end, the sender device 007 is connected to an input node 003 in this backbone network 1001 and the receiver device 009 is connected to an output node 004 of the backbone network 1001.

It is clear that more generally a same stream can be received simultaneously by several receiver devices, each connected to an output node of the network. Several receiver devices may possibly be connected to a same output node of the network.

Naturally, in practice, the same node can play the role of an input node if at least one sender device is connected to it and/or the role of an output node if a receiver device is connected to it. In the same way, a same device can be a receiver in certain data transmission operations and a sender in other data transmission operations.

FIGS. 4A and 4B present a first algorithm and a second algorithm of the method according to the invention, used to monitor the transmitted isochronous data stream through the home network 1000.

The first algorithm (FIG. 4A), implemented at a component level, as well as the second algorithm (FIG. 4B), implemented at a software level, essentially bring the output node 004 into play.

When the output node 004, referenced NB, receives the isochronous streams coming from the home network 1000 then, in a step 300, its copy-protection detection module 119 verifies whether the stream should be encrypted or not. To do this, it analyses the EMI bits contained in the header of the packets of the isochronous stream. If the EMI bits are equal to a predetermined value (according to the above specification, a non-zero value), it means that the stream has undergone a first encryption by means of a first key when this stream was sent from the sender device, and that it must therefore undergo a second encryption, by means of the second key, during its transmission to the receiver device. During its transmission through the home network, the stream must be kept encrypted following the first encryption or decrypted and transmitted in clear form on the whole network. The decision to maintain either encrypted or clear transmission is based on whether the transmission of the stream is being done for the first time, or whether the receiver device wishes to receive a stream that has already been transmitted in clear form through the home network for other receiver devices. It must be noted that, in both cases, the input node has not performed any encryption of the data stream. This has the advantage of reducing the processing load of this node.

If the stream does not have to be encrypted (the value of the EMI bits is zero), this means that it is available for copying by any apparatus that implements or does not implement the DTCP protocol. There is therefore no reason to carry out a second encryption.

If the stream has to be encrypted then, in a second step 301, the output node 004 obtains the list of stream-receiving devices (that listen to the channel used to transmit the encryption-protected isochronous stream) that are connected to it, including especially the receiver device 009.

In a step 302, the encryption module 116 of the output node 004 is reset for the content transmission channel in order to implement a second encryption of the isochronous stream by means of a second key proper to the output node 004. Finally, in a step 303 the copy-protection detection module 119 of the output node 004 informs the software program and/or the software sub-programs of the invention that the transmission channel is being used to transfer a copy-protected content.

At the software level, in a step 304, the software program (and/or the software sub-programs) of the invention is informed by the component level that a given transmission channel is being used to transfer a copy-protected content. Consecutively, in a step 305, it obtains an identifier of the input node 003 to which the isochronous stream sender device 007 is connected. In a step 306, the copy-protection rights proper to the output node 004, quantifying its level of authorization of access to the different devices connected to the network, are obtained.

The output node 004 will search for its own copy-protection rights in an internal memory space proper to it. According to a variant of this preferred embodiment, all the nodes connected to the network know the copy-protection rights of each of the other nodes of the network.

In a step 307, for all the receiver devices connected to the output node 004 and especially for the receiver device 009, a request for clear transmission comprising the copy-protection rights relative to the output node 004 is sent by the output node 004 to the input node 003.

FIG. 4C presents a third algorithm of the method according to the invention used to monitor the copy-protected isochronous data stream transmitted in the home network 1000. This algorithm, implemented at a software level, essentially makes use of the input node 003.

When the input node 003 receives a request for clear transmission, for example relating to the receiver device 009 (in a step 308) then, in a step 309, it extracts the number of the transmission isochronous channel used as well as the copy-protection rights associated with the request. Then, the copy-protection rights are inspected in the steps 310 and 311.

If the rights do not authorize the receiver device 009 connected to the output node 004 to access the protected content then, in a step 312, the input node 003 verifies that it is in the process of decrypting the stream comprising the protected content by means of the first key. If this is so then, in a step 313, the input node 003 stops the decryption of the stream associated with the previously extracted isochronous channel number. Once the decryption module 115 is stopped or if the input node 003 is not decrypting the stream, it implements the step 314 in which it informs the output node 004, which has sent the request, that the request relating to the receiver device 009 has been rejected. Then, the input node 003 ends the procedure in a step 315.

If the copy-protection rights authorize the receiver device 009 to access the protected content then, in a step 316, the input node 003 verifies that the corresponding stream is already decrypted. If this is the case, the input node 003 again performs the step 308.

In the case illustrated in FIG. 1A, where the sender device 007 is connected to the input node 003 by means of a digital connection, for example through an IEEE-1394 bus, if the corresponding stream is not already decrypted then, in a step 317, the input node 003 extracts the identifier of the isochronous stream sender device 007 from the isochronous channel and implements the DTCP authentication method at the sender device 007 in a step 318.

Once the input node 003, in a step 319, has received the first decryption key (which has previously been used by the sender device 007 to carry out the first encryption of the isochronous stream) from the sender device 007 then, in a step 320, the decryption module of the input node 003 is reset with the first key so as to decrypt the stream on the isochronous channel. Then, the input node 003 awaits the arrival of a new request to again carry out the step 308.

If, in a case that is not shown, the (analog type) sender device 007 should be connected to the input node 003 by means of an analog connection, then the decryption module of the input node 003 (which has previously itself carried out the first encryption by means of its own key) is reset with the first key, which is its own key, so as to decrypt the stream on the isochronous channel. Then, the input node 003 awaits the arrival of a new request to again carry out the step 308.

When the stream is decrypted by the input node to be transmitted in clear form on the home network, the value of the EMI bits must be maintained with their initial (non-zero) value to inform the output node that this stream must be encrypted when it is sent to the receiver device.

In parallel with the third algorithm of FIG. 4C, the software program and/or the software sub-programs of the invention implement a fourth algorithm, illustrated by FIG. 5, of the method according to the invention. This algorithm is used to authenticate the output nodes, and hence to condition the step 320 for the authentication of the isochronous data stream of FIG. 4C at the reception of an appropriate number of requests for clear transmission. This algorithm, implemented at a software level, essentially brings the input node 003 into play.

When, at a step 400, an isochronous stream connection is set up in the home network 1000 in order to transmit the protected content, the input node 003 analyses a routing header of the packets of the received isochronous stream in a step 401. This header may be added to the packets in order to convey isochronous packets on the network. In a step 402, the input node extracts therefrom the number, referenced Nc, of nodes of the home network 1000 to which the stream receiver devices (that listen to the channel used for the transmission of the isochronous stream) are connected.

Then the software program (and/or the software sub-programs) of the invention implement an idle step 403 during which the input node 003 waits for the expiry of a timeout period. This value of this timeout is defined as being the maximum lapse of time necessary for each node of the home network 1000 to send a request for clear transmission after having received and detected an encrypted isochronous stream.

In a step 404, once this period of time or timeout period has expired, the number of really received requests for clear transmission is analyzed by the software programs and/or the software sub-programs according to the invention. If this number is equal to the number, referenced Nc, of nodes of the home network 1000 to which the receiver devices of the stream are connected (namely the number of expected requests for clear transmission), then the software program (and/or the software sub-programs) of the invention repeat the initial step 400 of this fourth algorithm.

If this number is not equal to the number of nodes of the home network 1000 to which the receiver devices of the stream are connected, it may mean that an unauthorized device has been introduced into the home network 1000 and is illegally trying to access the encryption-protected content. Thus, in a step 405, the encryption node 003 immediately stops all the ongoing processes of decryption of isochronous streams and, in a step 406, informs all the connected node of the home network 1000 about this authentication failure. The software program (and/or the software sub-programs) of the invention then repeat the initial step 400 of this fourth algorithm.

In an alternative embodiment of the invention, the software program implements means to determine the output nodes that have transmitted requests for clear transmission among all the recipient or destination output nodes. Thus, it is possible to authenticate only one part of the output nodes. In this alternative embodiment, the input node may continue to transmit the decrypted data stream only toward the authenticated output nodes. This can be done by modifying the connection in changing the routing header for example.

When the connection is already set up with one or more output nodes and when one or more new receiver devices connected to different output nodes wish to receive the isochronous stream, then the existing connection has to be modified to serve or provide a "join function" for these new receivers.

The algorithm for the authentication of the new output nodes in this case is similar to the one described with reference to FIG. 5. The input node will execute the same steps 401, 402, 403 and 404. The difference is that the input node already transmits the stream in clear form on the home network for other receiver devices. In the input node will continue to transmit the stream in clear form until the authentication of the newly involved output nodes. If the authentication fails, the input node will stop the decryption of the stream towards at least the output nodes that have not been authenticated.

Furthermore, if several receiver devices should receive the isochronous stream, it is possible that a part of these receivers will wish to stop the reception of the stream. If output nodes no longer possess receiver devices that are recipient or destination nodes of this stream, the connection is modified so as to no longer serve these nodes. In this case, it is not necessary for the output nodes to transmit specific requests.

FIG. 6 illustrates the monitoring, by the software programs and/or the software sub programs according to the invention, of the secured transmission of the isochronous stream between the sender device 007 referenced S3 and the receiver device 009 referenced R3 in the case illustrated by FIG. 1A where the connection links of these devices with the input nodes 003, referenced NA, and output nodes 004, referenced NB, are digital links compliant with the IEEE-1394 standard.

The sender device 007 starts by sending an isochronous stream in a channel on the home network 1000 of FIG. 1A. The content 503 of this stream has been encrypted beforehand by means of a first key, its own encryption key 504 referenced key(S3).

It can first of all be noted that, before the output node 004 transmits this isochronous stream on an IEEE-1394 002 bus, especially to the receiver device 009, it first of all performs the second encryption by means of a second key which is its own key 506 referenced key(NB). Thus, the isochronous stream that will be sent on the IEEE-1394 bus is a twice-encrypted or doubly encrypted stream 505.

Upon the reception of the once-encrypted stream 503, the output node 004 verifies that some of the devices connected to it are listening to the channel of the isochronous stream. In particular, the receiver device 009 is one of them. Then, the output node 004 implements and sends a request for clear transmission 500 to the input node 003. The input node 003 verifies the copy-protection rights associated with the request for clear transmission 500.

If the rights are valid, the input node 003 implements a DTCP authentication method at the sender device 007 (comprising an authentication request 501 and its response 502). It thus obtains the first key 504 previously used by the sender device 007 to carry out the first encryption of the isochronous stream.

Then, the input node 003 uses the first key 504 to decrypt the isochronous stream 503 which has hitherto undergone only the first encryption. Thus, the stream 510 is sent in clear form between the input node 003 and the output node 004 in the backbone network 1001.

When it exits from the backbone network 1001, and reaches the receiver device 009, the isochronous stream is encrypted by the output node 004 through the second key 506, as explained here above. Thus, when it receives the encrypted stream 509 that it wishes to access, the receiver device 009 implements a DTCP authentication method at the output node 004 (comprising an authentication request 507 and its response 508). It thus obtains the second key 506.

Then the device 009 uses the second key 506 to decrypt the isochronous stream 509 which is no longer encrypted except through the second key. Thus, the stream resulting from this second encryption is a non-encrypted stream and the receiver device 009 can access the content contained in this stream.

If the copy-protection rights associated with the request for clear transmission 500 do not authorize the receiver device 009 to access the content (i.e. if the rights are not valid), the input node 003 does not perform the first encryption of the isochronous stream 503 which until then has only undergone the first encryption. Thus, the stream 503 is transmitted in encrypted form by means of the first key 504 between the input node 003 and the output node 004 in the backbone network 1001.

Then, when it receives the doubly encrypted stream 505 that it wishes to access, the receiver device 009 carries out an authentication procedure DTCP at the output node 004 (comprising an authentication request 507 and its response 508). It thus obtains the second key 506 by which it can partially decrypt the isochronous stream. However, the stream 503 resulting from this partial decryption remains encrypted through the first key 504. Thus, the receiver device 009 cannot access the content contained in the resulting stream 503.

It can be noted that, during the transmission of an isochronous stream through the backbone network 1001, between the sender device 007 and the receiver device 009, according to the securing method of the invention, only two DTCP authentication methods are implemented. The implementation of the DTCP protocol according to the prior art—in this context would have necessitated three such DTCP methods. Thus, the method of the invention limits the network load related to copy protection and reduces the time of transmission of the protected isochronous streams.

FIG. 7 illustrates the monitoring by the software program and/or the software sub-programs of the invention of the secure transmission of the isochronous stream between the sender device 013, referenced Sa1, and the receiver device 009, referenced R3, in the case illustrated by FIG. 1A where the connection link between the sender device 013 and the input node 003, referenced NA, is an analog link while the connection link between the receiver device 009 and the output node 004, referenced NB, is a digital link.

When the input node 003 detects the need for copy protection (for example the activation of anti-reproduction means according to the "macrovision" system designed and developed by the firm MACROVISION™) for a content sent by the analog sender device 013, it starts carrying out a first encryption of this content using a first key, its own encryption key referenced key(NA). Then, it sends the content on the backbone network 1001 in an isochronous stream 601.

It can be noted that, before sending this isochronous stream on an IEEE-1394 002 bus, especially to the receiver device 009, the output node 004 first of all performs a second encryption using a second key which is its own key 606 referenced key(NB). Thus, the isochronous stream that will be sent on the IEEE-1394 bus is a twice-encrypted or doubly encrypted stream 603.

Upon reception of the once-encrypted stream 601, the output node 004 verifies that some of the devices connected to it are listening to the channel of the isochronous stream. In particular, the receiver device 009 is one of them. Then, the output node 004 implements and sends a request for clear transmission 600 to the input node 003. The input node 003 verifies the copy-protection rights associated with the request for clear transmission 600.

If the rights are valid, the input node 003 stops the first encryption of the content sent by the analog sender device 013. Thus, the stream 610 is sent in clear form between the input node 003 and output node 004 in the backbone network 1001.

When it exits from the backbone network 1001, to reach the receiver device 009, the isochronous stream is encrypted by the output node 004 through the second key 606, as explained here above. Thus, when it receives the encrypted stream 609 that it wishes to access, the receiver device 009 implements a DTCP authentication method at the output node 004 (comprising an authentication request 604 and its response 605). It thus obtains the second key 606.

Then the device 009 uses the second key 606 to decrypt the isochronous stream 609 which is no longer encrypted except through the second key. Thus, the stream resulting from this second encryption is a non-encrypted stream and the receiver device 009 can access the content contained in this stream.

If the copy protection rights associated with the request for clear transmission 600 do not authorize the receiver device 009 to access the content (i.e. if the rights are not valid), the input node 003 does not stop the first encryption of the content sent by the sender device 013. Thus, the stream 601 is transmitted in encrypted form by means of the first key referenced key(NA) between the input node 003 and the output node 004 in the backbone network 1001.

Then, when it receives the doubly encrypted stream 603 that it wishes to access, the receiver device 009 carries out an authentication procedure DTCP at the output node 004 (comprising an authentication request 604 and its response 605). It thus obtains the second key 606 by which it can partially decrypt the isochronous stream. However, the stream 601 resulting from this partial decryption remains encrypted through the first key referenced key(NA). Thus, the receiver device 009 cannot access the content contained in the resulting stream 601.

It can be noted that, during the transmission of an isochronous stream through the backbone network 1001, between the sender device 013 and the receiver device 009, according to the securing method of the invention, only two DTCP authentication methods are implemented. The implementation of the DTCP protocol according to the prior art in this context would have necessitated two such DTCP methods. Thus, the method of the invention limits the network load related to copy protection and reduces the time of transmission of the protected isochronous streams.

What is claimed is:

1. A method for securing the transfer of a data stream from a sender device to at least one receiver device, through a network comprising a plurality of nodes, the sender device being connected to an input node, each receiver device being connected to a respective output node, wherein the method comprises the following steps:
   a) transmitting the data stream from the sender device to each receiver device via the input node and the respective output node to which each receiver device is connected, the data stream being encrypted from the sender device to the input node with a first key;
   b) informing each output node by the input node that transmitting or maintaining a transmission of the data stream in clear form from the input node to each respective output node necessitates authentication of each respective output node;
   c) receiving, by the input node, at least one authentication request sent by at least one output node;
   d) authenticating, by the input node, each output node from which an authentication request has been received; and
   e) transmitting the data stream in clear form to, at most, the authenticated output nodes and stopping the transmission of the data stream to the other output nodes.

2. A method according to claim 1 wherein the step of authenticating each output node comprises the steps of:
   determining the number N1 of output nodes that are destination nodes of the data stream;
   determining the number N2 of requests for transmission in clear form received by the input node; and
   authenticating the output nodes if the numbers N1 and N2 are equal.

3. A method according to claim 2 wherein said step of determining the number N2 is performed by counting the number of requests for transmission in clear form actually received before the end of a timeout period having a predetermined duration.

4. A method according to claim 2 wherein the request for transmission in clear form comprises at least one piece of information to quantify a level of authorization of the receiver device for access to said data.

5. A method according to claim 1 wherein, if the output nodes are not authenticated, the input node sends a notification to the other nodes informing them of the failure of the authentication.

6. A method according to claim 1, wherein, if a receiver device is of a digital type, the method further comprises the following steps:
   1) encrypting the data stream received by the output node corresponding to the digital receiver device with a second key;
   2) transmitting the encrypted data stream by the output node to the receiver device;
   3) authenticating the receiver device by the output node so that the receiver device obtains the second key; and
   4) decrypting the data stream by the receiver device with the second key.

7. A computer-readable information-storage means, comprising instructions for a computer program adapted to implement, when said program is executed on a computer, a method for securing the transfer of a data stream from a sender device to at least one receiver device, through a network comprising a plurality of nodes, the sender device being connected to an input node, each receiver device being connected to a respective output node, wherein the method comprises the following steps:

a) transmitting the data stream from the sender device to each receiver device via the input node and the respective output node to which each receiver device is connected, the data stream being encrypted from the sender device to the input node with a first key;
b) informing each output node by the input node that transmitting or maintaining a transmission of the data stream in clear form from the input node to each respective output node necessitates authentication of each respective output node;
c) receiving, by the input node, at least one authentication request sent by at least one output node;
d) authenticating, by the input node, each output node from which an authentication request has been received;
e) transmitting the data stream in clear form to, at most, the authenticated output nodes and stopping the transmission of the data stream to the other output nodes.

8. An input node involved in a secure transfer of a data stream from a sender device to at least one receiver device through a network comprising a plurality of nodes, the sender device being connected to said input node, each receiver device being connected to a respective output node, said input node comprising:
a) a first transmitting unit configured to transmit the data stream from the sender device to each receiver device via the input node and the respective output node to which each receiver device is connected, the data stream being encrypted from the sender device to the input node with a first key;
b) a unit configured to inform each output node by the input node that transmitting or maintaining transmission of the data stream in clear form from the input node to each respective output node necessitates authentication of each respective output node;
c) a unit configured to receive at least one authentication request sent by at least one output node;
d) a first unit configured to authenticate each output node from which an authentication request is received so that the data stream is transmitted in clear form by the first transmitting unit to, at most, the authenticated output nodes.

9. An input node according to claim 8 wherein the first unit configured to authenticate each output node comprises:
a unit configured to determinate the number N1 of output nodes that are destination nodes of the data;
a unit configured to determinate the number N2 of requests for transmission in clear form received by the input node; and
a unit configured to compare the numbers N1 and N2.

10. An input node according to claim 9 wherein the unit configured to determine the number N2 comprises a unit configured to count the number of requests for transmission in clear form actually received before the end of a timeout period with a predetermined duration.

11. An input node according to claim 9 wherein the request for transmission in clear form comprises at least one piece of information to quantify a level of authorization of the receiver device for access to the data.

12. An input node according to claim 8 comprising a second transmitting unit configured to transmit to the other nodes a notification of failure of authentication, said second transmitting unit being activated if the output nodes are not authenticated.

* * * * *